INVENTOR
Otto J. M. Smith
Richard A. Dye
BY Flehr and Swain
ATTORNEY

DELAY LINE

INVENTOR.
Otto J. M. Smith
BY Richard A. Dye
[signature]
ATTORNEY

INVENTOR.
Otto J. M. Smith
BY Richard A. Dye
Flehr and Swain
Attorneys

March 15, 1966 O. J. M. SMITH ETAL 3,241,129

DELAY LINE

Filed Dec. 14, 1959 5 Sheets-Sheet 4

INVENTOR
Otto J. M. Smith
Richard A. Dye

BY [signature]

ATTORNEY

INVENTOR
Otto J. M. Smith
Richard A. Dye
BY Flehr and Swain
ATTORNEY

United States Patent Office 3,241,129

Patented Mar. 15, 1966

3,241,129

DELAY LINE

Otto J. M. Smith, 612 Euclid Ave., Berkeley, Calif., and Richard A. Dye, 25751 Purissima, Los Altos, Calif.

Filed Dec. 14, 1959, Ser. No. 859,358
29 Claims. (Cl. 340—174)

This invention relates to delay lines and more particularly to magnetic core delay lines for low frequencies and long time delays.

In delay lines heretofore provided, delay has been obtained by transforming a signal from one type of storage to another. Delay lines of this type, therefore, require at least two types of energy storage. Such lines have been found to be unduly expensive and too large where relatively long time delays are required or where low frequencies are being encountered. Attempts have been made to utilize magnetic cores in delay lines, but heretofore such circuits utilizing magnetic cores have been found to be impractical. For example, one such delay line was found to be unsatisfactory because it had volt-time area degeneration.

In general, it is an object of the present invention to provide a delay line which is suitable for use with very low frequencies and for long time delays.

Another object of the invention is to provide a delay line of the above character in which magnetic cores are utilized.

Another object of the invention is to provide a delay line of the above character in which the information is stored in the form of a quantity of flux in the magnetic core.

Another object of the invention is to provide a delay line of the above character in which the output is in the form of a pulse-length modulated voltage.

Another object of the invention is to provide a delay line of the above character in which the output can be filtered to obtain a waveshape closely resembling the input waveshape.

Another object of the invention is to provide a delay line of the above character in which the volt-time area of the information pulse is transferred down the line without degeneration.

Another object of the invention is to provide a delay line of the above character in which the information can be sampled from various points within the delay line to provide an intermediate transference.

Another object of the invention is to provide a delay line of the above character in which the inputs can be only one polarity or of both polarities.

Another object of the invention is to provide a delay line of the above character in which the input is periodically sampled.

Another object of the invention is to provide a delay line of the above character in which the input is continuously sampled.

Another object of the invention is to provide a delay line of the above character in which the core reset voltage is proportional to the sampling frequency and wherein the volt-time integral of one-half cycle is constant, that is, independent of frequency.

Another object of the invention is to provide a delay line of the above character which has a voltage controlled dead time or delay time.

Another object of the invention is to provide a delay line of the above character in which compensation is provided for any reset error which may accumulate.

Additional objects and features of the invention will appear from the following description in which the preferred embodiments have been set forth in detail in conjunction with the accompanying drawings.

Referring to the drawing.

Figures 1, 2, 3:
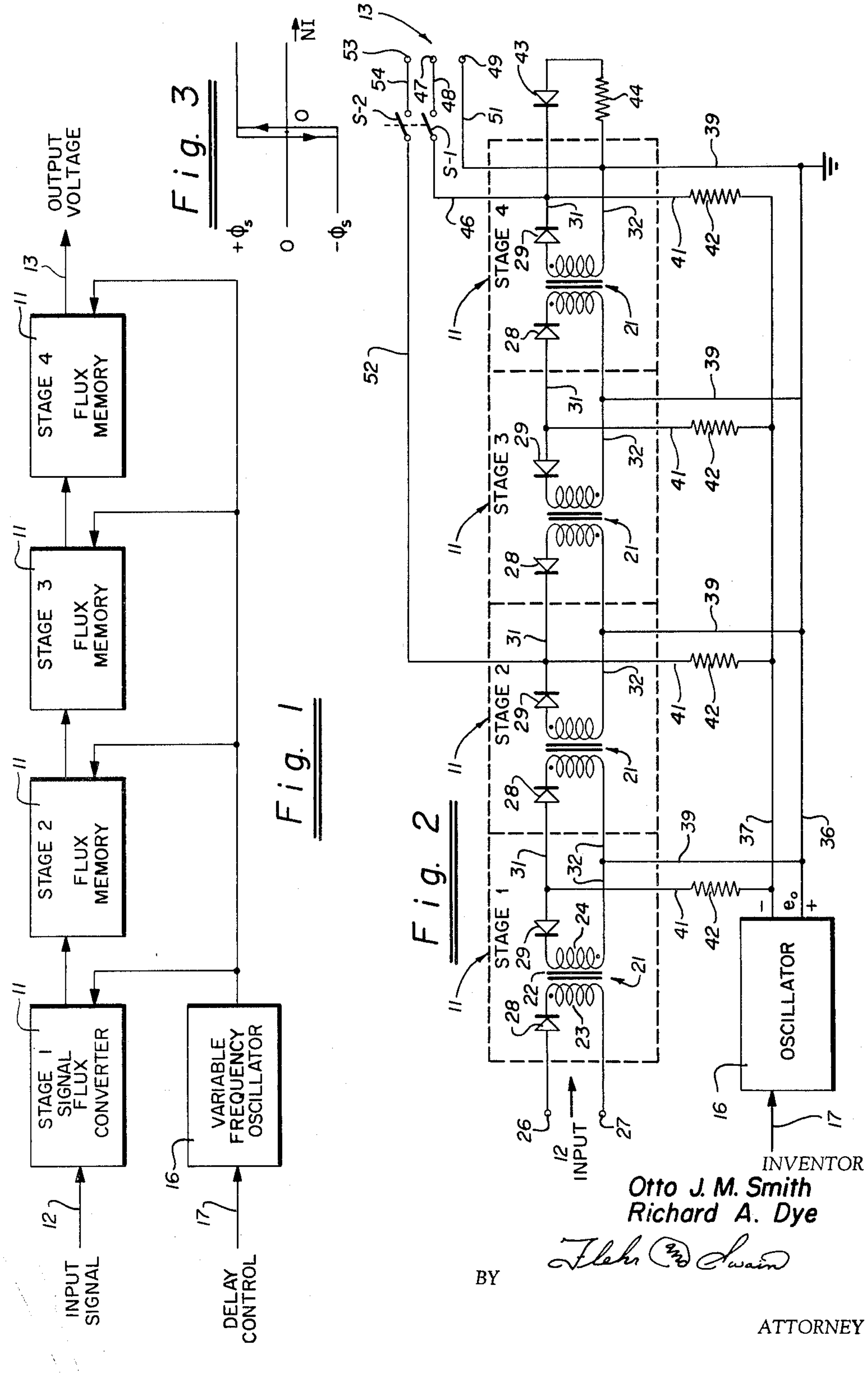
FIGURE 1 is a block diagram of a delay line incorporating the present invention.
FIGURE 2 is a circuit diagram of a half wave delay line of the type shown in FIGURE 1.
FIGURE 3 shows the hysteresis loop of one of the magnetic cores utilized in the invention.

FIGURES *4a*, *4b*, *4c*, *4d* and *4e* are waveforms produced in the delay line shown in FIGURE 2 with a sinewave oscillator.

FIGURES *5a*, *5b*, *5c*, *5d* and *5e* are waveforms produced in the delay line shown in FIGURE 2 with a squarewave oscillator.

Figure 4A:
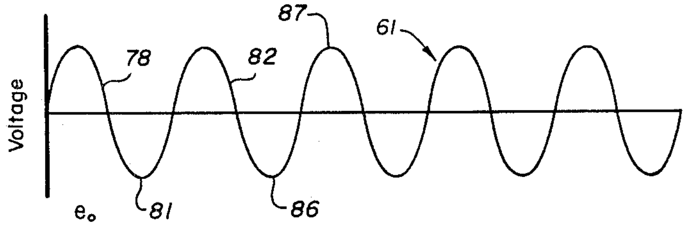
Figure 4B:
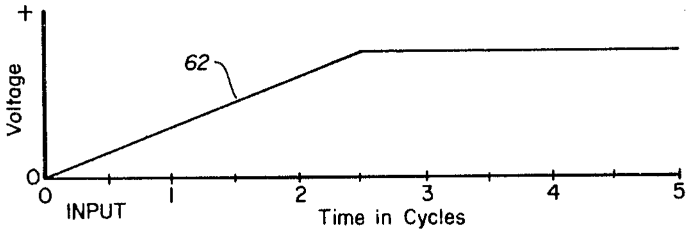
Figure 4C:
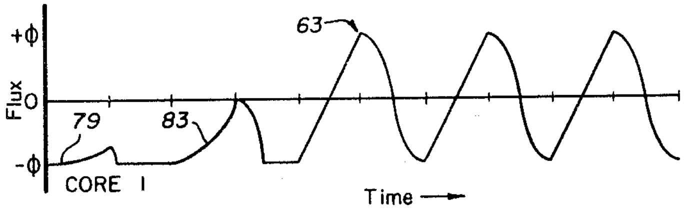
Figure 4D:
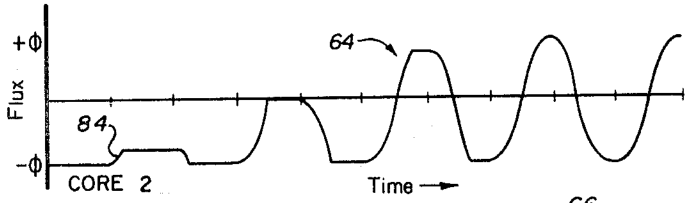
Figures 4E, 6:
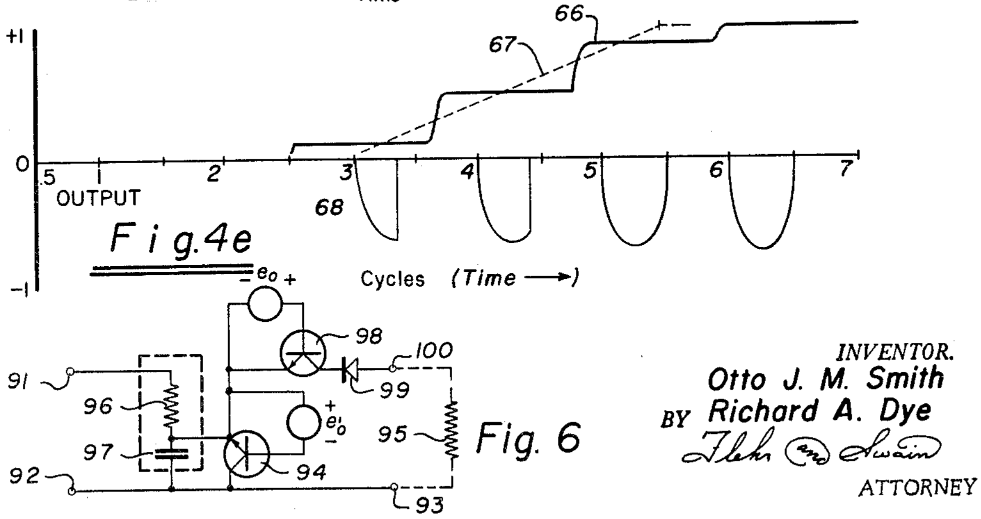

FIGURE 6 is a circuit diagram of a pulse stretcher or zero order hold which can be utilized for filtering the output of the delay line shown in FIGURE 2.

Figure 7:
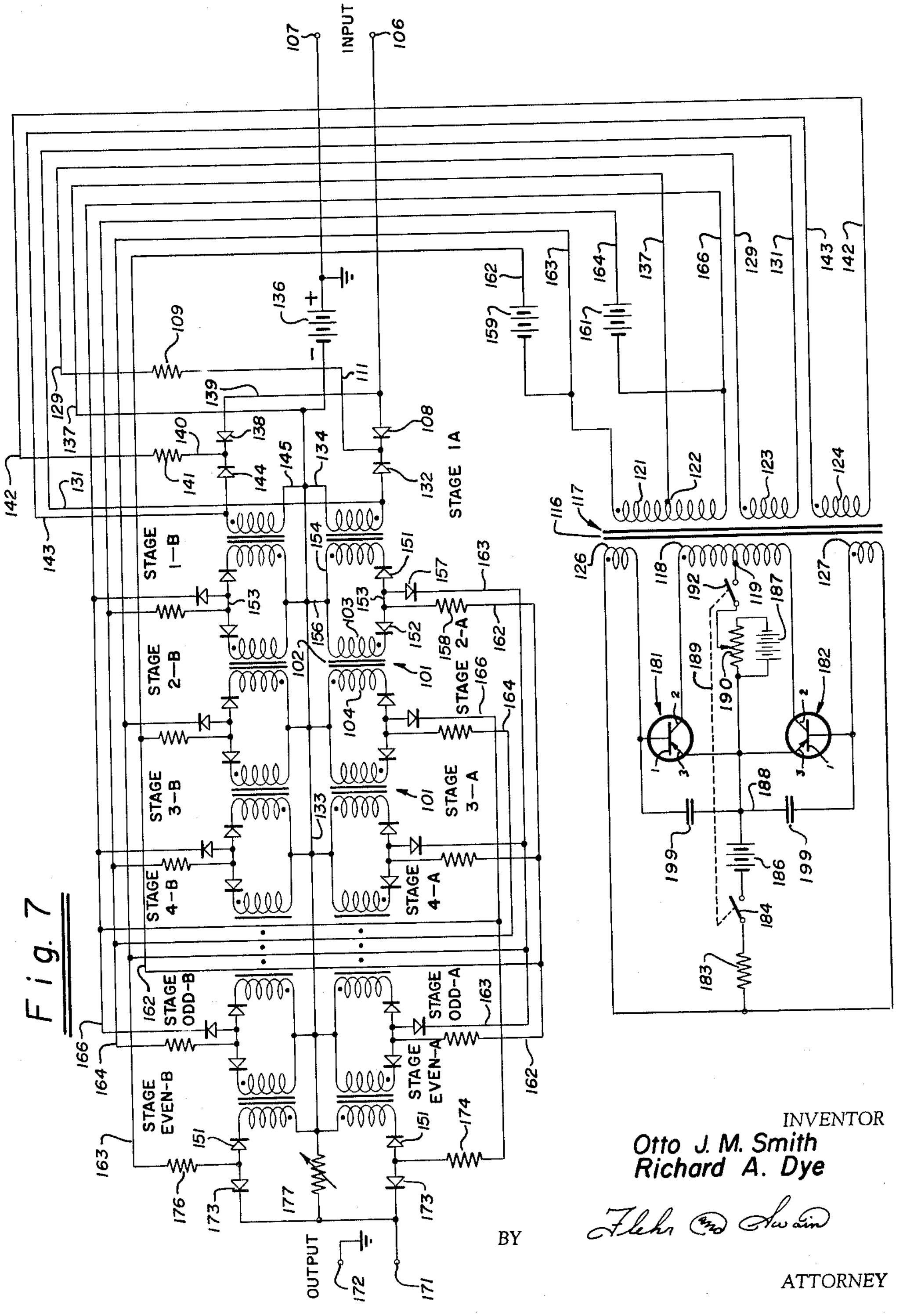

FIGURE 7 is a circuit diagram of a full wave delay line with a squarewave oscillator and power supply.

Figures 8, 9, 10:
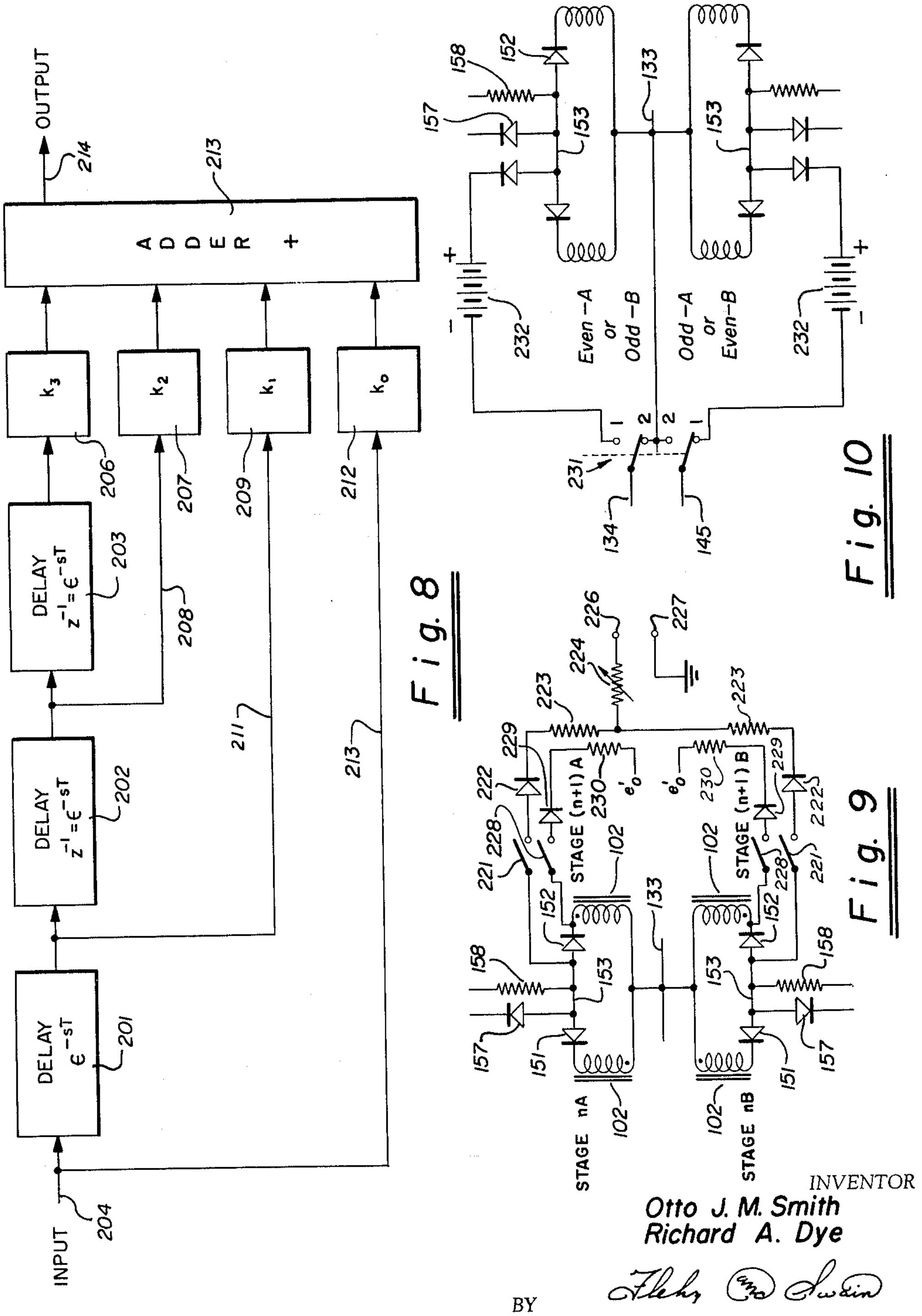

FIGURE 8 is a block diagram of a circuit for generating a polynominal in $z$, where $z^{-1}=\exp(-sT)$.

FIGURE 9 is a circuit diagram for each of the sampling circuits shown in block diagram form in FIGURE 8.

FIGURE 10 is a circuit diagram for a negative feedback circuit which can be used to provide a sequence of steps.

In general, our delay line consists of a plurality of serially connected memory stages in which each of the stages is provided with a storage element. Frequency means is utilized for applying a shifting signal to each of the stages to cause the information stored in each stage to be transferred to the succeeding stage in the series. The delay lines can be either half wave or full wave. The information stored can be sampled at various points within the line.

More particularly and with reference to the block diagram shown in FIGURE 1, our delay line consists of a plurality of serially connected memory stages 11 in which the first stage in the series is supplied with an input signal 12 which can be in the form of a voltage and in which the last stage in the series supplies the output signal 13, also in a suitable form such as a voltage. Each of the stages, as hereinafter described, contains a memory or storage element preferably in the form of a magnetic core which stores the information in the form of a quantity of flux. The first stage converts the signal into a flux so that it can be stored.

Frequency means in the form of a variable frequency oscillator 16 having a control 17 for varying the frequency is connected to each of the memories 11 and is utilized for causing the memory block to deliver the contents of its memory to the succeeding memory when a shifting signal is received from the frequency means 16. It is apparent that any signal appearing on the output 13 of the last memory in the series must have been stored successively in the four stages, and for that reason, four shifting signals from the frequency means 16 must have been supplied to the four memories for the information to pass through the entire delay line. With the same shifting signal being applied to each of the memories 11, it is readily apparent that the total delay time of the delay line is directly dependent upon the frequency output of the frequency means 16. Thus, when the frequency of the frequency means 16 is doubled, the delay time of the delay line is halved. If the control 17 is changed to halve the frequency of the frequency means 16, the delay time will be doubled. If desired, the delay time of the delay line can be varied continuously while the delay line is receiving and delivering information merely by continuously varying the output frequency of the frequency means 16 through the control 17.

As shown in the circuit diagram in FIGURE 2, each of the stages 11 includes a memory or storage element preferably in the form of a suitable magnetic core 21 such as a magnetic core bearing No. 50057 manufactured by Magnetics, Inc., which is a toroidal core wound with "Orthonol" one mil tape. Each of the magnetic cores has a core 22 wound with primary and secondary windings 23 and 24, respectively. The dots associated with each of the windings represents the conventional polarity markings for such cores.

The primary winding 23 is considered to be the input circuit to the stage, whereas the secondary winding 24 is considered to be the output circuit for this stage. The input circuit for the first stage is identified by the number 12 and is provided with a positive terminal 26 and a negative terminal 27. A diode 28 is connected to the dotted end of each of the primary windings 23 of each stage so that current can only enter the primary winding 23 through the dotted end. It will be noted that the positive terminal of the input circuit is connected to the diode 28 for the first stage, whereas the negative terminal 27 is connected to the undotted end of the primary winding 23. A diode 29 is connected to the top end of the secondary winding 24 of each of the stages and permits current to enter only the undotted end of the secondary windings. The stages are connected in series by connecting the output of one stage to the input of the succeeding stage.

Thus, the diode 29 connected to the top side of the secondary winding of the magnetic core in the first stage is connected to the top side of the primary winding of the magnetic core in the second stage by a conductor 31. The bottom end of the secondary winding of the first stage is connected to the bottom end of the primary winding of the second stage by a conductor 32. Similarly, the succeeding stages are connected by conductors 31 and 32. It will be noted that the conductor 31 for the first and third stages serves to connect the positive terminals of the diodes 28 and 29, whereas between the second and third stages, the conductor 31 serves to connect the negative terminals of the diodes 28 and 29. With the connections shown, current can only enter the dotted ends of the primary windings and the undotted ends of the secondary windings of the magnetic cores.

The oscillator 16 is shown in block form because it is of a conventional type. The output of the oscillator can be a sine wave, a squarewave, or a sequence of pulses of the same or alternating polarity. The oscillator 16 is provided with positive and negative terminals 36 and 37, and generates a voltage across these terminals which is designated as $e_0$. The output of the oscillator is supplied to each of the stages to cause shifting of the information in the stages as hereinafter described. The positive terminal is grounded as shown and is connected to each of the conductors 32 by a conductor 39 and the negative terminal is connected to each of the conductors 31 by a conductor 41 through a current limiting resistor 42.

In the last stage, the conductor 31 is connected to the negative terminal of a diode 43. A load resistor 44 is connected between the positive terminal of the diode 43 and the conductor 32 connected to the bottom side of the secondary winding of the magnetic core of the last stage. The conductor 31 for the last stage is connected to one side of a double pole switch S–1 by a conductor 46. The other side of the switch S–1 is connected to an output terminal 47 by a conductor 48. The conductor 32 of the last stage is connected to an output terminal 49 by a conductor 51. The conductor 31 of the second stage is connected to one side of a switch S–2 by a conductor 52, and the other side of the switch S–2 is connected to a terminal 53 by a conductor 54. The purpose of the additional terminal 53 is hereinafter described in conjunction with the pulse stretcher shown in FIGURE 5.

The operation of the circuit shown in FIGURE 2 may now be briefly described in conjunction with FIGURES 3, 4*a*, 4*b*, 4*c* and 4*d*. FIGURE 3 shows the hysteresis loop of the magnetic core as utilized in the present invention. The hysteresis loop is plotted as flux versus ampere turns of magnetizing current, and as shown in FIGURE 3 is substantially rectangular. Saturation value of flux in the core is designated as $\pm\phi_s$.

In FIGURE 4*a* is shown the sinusoidal waveform of the output of the oscillator 16. The waveform is shown by the curve 61 to be an alternating sine wave. FIGURE 4*b* shows a curve 62 which is a typical input signal. FIGURE 4*c* shows a waveform 63 of the flux in the magnetic core in stage one for the input shown in FIGURE 4*b*. FIGURE 4*d* shows the waveform 64 of the flux in a core in the second stage for this same input. FIGURE 4*e* shows the filtered output voltage in curve 66, the average filtered delay in curve 67, and the unfiltered output voltage in curve 68.

As explained previously, the oscillator 16 in FIGURE 2 may have any convenient waveform. The operation of the delay line is relatively independent of the waveform. FIGURES 4*a*, 4*b*, 4*c*, 4*d* and 4*e* show the waveforms in the delay line for a sine-wave oscillator. FIGURES 5*a*, 5*b*, 5*c*, 5*d* and 5*e* shows the waveforms in the delay line of FIGURE 2 when the oscillator 16 delivers a squarewave.

Figure 5A:
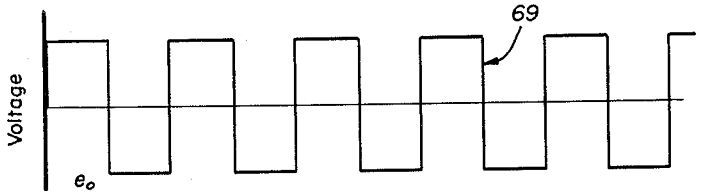
Figure 5B:
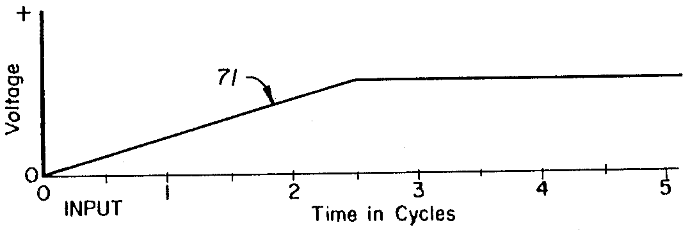
Figure 5C:
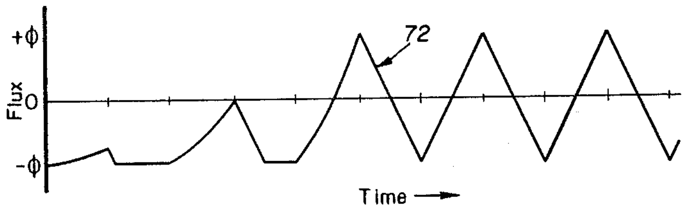
Figure 5D:
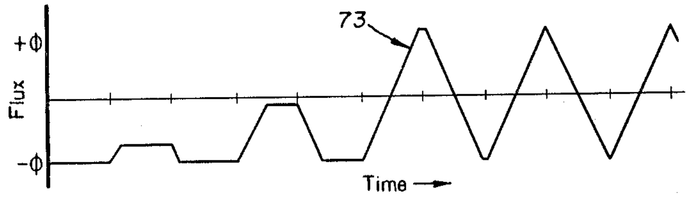
Figure 5E:
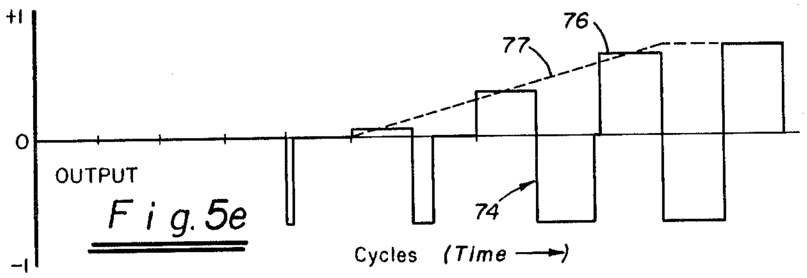

In FIUGRE 5*a* is shown the squarewave output of oscillator 16. The waveform is shown by curve 69 to be an alternating squarewave. FIGURE 5*b* shows a curve 71 which is the typical input signal. FIGURE 5*c* shows a waveform 72 of the flux in the magnetic core in stage one for the input shown in FIGURE 5*b*. FIGURE 5*d* shows the waveform 73 of the flux in the second stage for this same input. FIGURE 5*e* shows curve 74, the unfiltered output voltage for half cycle output only, and curve 76, the filtered output voltage after the zero-order hold for half-wave output only. Curve 77 is the average filtered delay.

Before a signal is applied to the delay line, the flux in all the cores in the stages is at negative saturation, that is, $-\phi_s$, due to the rectified half cycle of the output voltage $e_0$ from the oscillator 16 impressed on the secondary windings 24 of the magnetic cores. Now, assuming a sine wave output from the oscillator as shown in FIGURE 4*a*, during the first half-cycle 78 of the output of the oscillator 16, a positive input as indicated by the corresponding portion of the waveform 62 is impressed across the primary winding 23 of the first stage through the diode 28. This input signal which is in the form of a voltage is continuously converted into a rate of change of flux by being impressed across the primary winding 23 of the magnetic core. The flux in the core 22 is the integral of the applied voltage with respect to time. Thus, during the first half cycle, it is $$-{}_s\phi+\int_0^t v_i dt$$

This change in flux is shown at 79 in the waveform 63 as shown in FIGURE 4*c*. At the end of the first half cycle, $e_0$ goes negative. This makes the line 41 positive causing diode 29 to conduct. The dot end of the secondary winding 24 is made negative which makes the dot terminal of the primary winding 23 negative so diode 28 becomes non-conducting and disconnects the input 12 from the primary winding 23. The diode 28, therefore, acts as a switch. The potential across the primary and secondary windings 23 and 24 is, therefore, $e_0$ with a polarity such that the flux in tne magnetic core of the first stage is being returned to negative saturation. The flux reaches negative saturation when the volt-time integral during the second half cycle 81 is exactly equal to the volt-time integral during the first positive half cycle 78. After this time, the magnetic core for the first stage is saturated and there is no voltage across the primary and the secondary windings 23 and 24. The short circuit current through the winding 24 is limited by the resistor 42. The input to the magnetic core is also shorted through diode 28 and the winding 23. The current is limited by the internal impedance of the input supply. Thus, as shown in FIGURE 4*c*, the magnetic core for the first stage is again negatively saturated at the end of the second half cycle 81. During the third half cycle 82, $e_0$ is again positive and diode 29 is non-conducting. The primary winding, therefore, has the input voltage impressed across it. The flux in the core 22 for the first magnetic core rises an amount equal to the volt-time integral of the input during the third half cycle as shown by the portion 83 of the curve 63 in FIGURE 4*c*.

The magnetic core in the second stage receives its information from the core in the first stage during the half cycles when the core of the first stage is being reset to negative saturation. During the second half cycle 81, when the secondary winding of the first stage has a voltage $e_0$ impressed across it, this same identical voltage appears on the input circuit of the second stage and is impressed across the primary winding 23 of the second stage because the input diode 28 of the second stage is conducting. When the magnetic core of the first stage reaches negative saturation, the voltages across the secondary winding of the magnetic core of the first stage and the primary winding 23 of the magnetic core of the second stage both go to zero simultaneously. The volt-time integral for the magnetic core of the second stage during this half cycle is, therefore, identical to the volt-time integral for the magnetic core of the first stage, as shown by the portion 84 of the waveform 64 in FIGURE 4*d*. The flux changes in the two cores are, therefore, equal and opposite since the magnetic core in the first stage is returning to negative saturation and the magnetic core for the second stage is rising up from negative saturation. Resetting the magnetic core of the first stage, therefore, simultaneously passes the information on to the magnetic core of the second stage. This is shown in FIGURE 4*d*.

In the third half cycle, the magnetic core for the first stage receives the input; the magnetic core for the second stage is being reset; and the magnetic core for the third stage receives a negative signal from the output circuit of the second stage. During the fourth half cycle 86, the magnetic core of stage three is reset and delivers a positive signal on its output circuit to the input circuit of the magnetic core of the fourth stage. During the fifth half cycle 87, the magnetic core for the fourth stage is reset and delivers a negative signal on the conductor 31 to the output circuit 13. This signal appears across the output load resistor 44. It is, therefore, pulse area modulated and appears during the odd half cycles. It is delayed by four half cycles after the equivalent input voltage because four stages are utilized in the delay line. These negative output pulses 68 are shown in FIGURE 4*e*. Such pulses are the unfiltered output of the delay line and may be satisfactorily used in a variety of control and servo-mechanism applications where the average output is the important information and where the pulse wave shape is unimportant.

From the foregoing description, it is apparent that the circuit shown in FIGURE 2 is only a half wave delay line, that is, samples of the input are taken only on the positive half cycles of $e_0$. FIGURES 5*c*, 5*d* and 5*e* show the waveforms produced in the delay line in FIGURE 2 with a squarewave output from the oscillator 16.

A filter for use with the half wave delay line shown in FIGURE 2 is shown in FIGURE 6. It is provided with terminals 91 and 92 which are adapted to be connected to terminals 47 and 49, respectively, shown in FIGURE 2. Terminal 91 is connected to the negative output terminal 93. Terminal 91 is connected to the emitter of a transistor 94 through a series resistor 96. The emitter of the transistor 94 is connected to terminal 92 through the series capacitor 97. The collector of the transistor 94 is connected to terminals 92 and 93. The emitter of transistor 98 is connected to the emitter of transistor 94. The colletcor of transistor 98 is connected through the series diode 99 to the output terminal 100. If desired, a load resistor 95 may be connected from terminal 100 to terminal 93. A squarewave power supply voltage $e_0$ is connected from base to emitter of transistor 94. Very short voltage pulses from the derivative of a squarewave power supply $e_0'$ are connected from base to emitter of transistor 98.

Operation of the filter as shown in FIGURE 6 may now be briefly described as follows. In general, the filter shown in FIGURE 6 is termed a zero order hold. It integrates the output voltage of the delay line and reproduces the corresponding volt-time integral in height-modulated pulse form. These pulses are delayed an additional one-half cycle of the supply frequency due to the integrating properties of the R-C network and the switching action of the transistors and voltage sources. The network replaces the load resistor 44 in FIGURE 2, terminals 91 and 92 being connected to the anode side of diode 43 and to terminal 49, respectively, in FIGURE 2. During the gating half-cycle of core 4, the integrating network consisting of resistor 96 and capacitor 97 integrates the output voltage. During the following half-cycle, this volt-time integral is impressed across load resistor 95 in the form of a constant-width, height-modulated voltage due to the switching action of transistor 98 and the squarewave supply source $e_0$. To prevent initial charge from existing and introducing error into the output pulse, capacitor 97 is periodically discharged instantaneously at the beginning of the gating half cycle by the action of the transistor 94 and the derivative of the squarewave supply source, $e_0'$. The resulting height-modulated pulse is discharged and acquires an exponential slope if the ratio of resistor 95 to resistor 96 is not much greater than one. The filtered output obtainable with this network is shown in FIGURE 5*e* as curve 76 for one-half wave only.

It will be noted that the circuitry shown in FIGURE 2 is applicable for positive inputs only. A bias must be provided if the inputs of both polarities are to be delayed.

The dashed lines 67 in FIGURE 4*e* and 77 in FIGURE 5*e* both show that the average filtered delay is equal to five half cycles. The four cores each provide one-half cycle delay, and the capacitor 97 in the zero order hold circuit provides the fifth half cycle of delay.

Another embodiment of our invention is shown in FIGURE 7 and consists of two magnetic core delay lines used in push-pull so that the input is continuously sampled. The stages in one of the lines (the lower line) have been designated as 1A, 2A, 3A, etc., whereas the stages in the other or upper line have been designated 1B, 2B, 3B, etc. Each of the stages 1A, 1B, 2A, 2B and so forth is provided with a core unit 101 which includes a magnetic core 102 upon which are wound primary and secondary windings 103 and 104. The input to the stages is applied through input terminals 106 and 107 with input terminal 107 grounded as shown. The input signal is applied to the dot end of the primary winding 103 for the magnetic core of stage 1A through a diode 108 which is connected to one side of a resistance 109 by a conductor 111. The other side of the resistance 109 is connected to the dot side of a winding 123 by a conductor 129. The winding 123 forms a part of the transformer 116 of the squarewave generator and power supply. The transformer 116 includes a magnetic core 117 upon which is wound a primary winding 118 provided with a center tap 119. The transformer is also provided with a secondary winding 121 which has a center tap 122 and secondary windings 123 and 124. It is also provided with additional windings 126 and 127.

The other side of the winding 123 is connected to a conductor 131 which is connected to the dot terminal of the primary winding 103 of the core for stage 1A. A diode 132 is connected between the conductor 111 and the conductor 131. The undotted terminal of the primary winding 103 is connected to a common conductor 133 by a conductor 134. The common conductor 133 is connected to the negative terminal of a suitable D.-C.

supply such as a battery 136. The positive terminal of the battery is connected to the grounded terminal 107. The common conductor 133 is also connected to the center tap 122 of the transformer 116 by a conductor 137.

Similarly, stage 1B is connected to the input terminal 106. As shown, the input terminal 106 is connected to the dotted terminal of the primary winding 103 for the magnetic core of stage 1B through a diode 138 which is connected to the input terminal 106 by a conductor 139. The diode 138 is connected to a resistor 141 which is connected to one side of the winding 124 of the transformer 116 by a conductor 142. The other side of the winding 124 is connected to a dot terminal of the primary winding 103 by a conductor 143. A diode 144 is connected between the conductor 140 and the conductor 143. The undotted terminal of the primary winding is connected to the common conductor 133 by a conductor 145.

The remainder of the circuitry for stages 1A and 1B, and the circuitry for stages 2A, 2B, 3A, and 3B, and so forth, is duplicated as can be seen from the circuit diagram. In general, the secondary winding 104 of the preceding stage has its undotted terminal connected to a diode 151 and the diode 151 is connected to a diode 152 by a conductor 153. The diode 152 is connected to the dotted terminal of the primary winding 103 of the succeeding stage. The dotted terminal or side of the primary winding of the preceding stage is connected to the undotted terminal or side of the primary winding 103 of the succeeding stage by conductor 154. The conductor 154 is connected to the common conductor 133 by a conductor 156. The conductor 153 is connected through a diode 157 to a common conductor 163 which is connected to the negative side of a D.-C. power supply 159. The conductor 153 is also connected to a common conductor 162 through resistor 158. Common conductor 162 is connected to the positive terminal of the D.-C. power supply 159.

Each of the conductors 153 connecting a preceding stage to the succeeding stage is connected to a diode 157 and a resistance 158. The resistors 157 and diodes 158 are connected to either of two D.-C. power supplied or batteries 159 and 161 by common conductors 162, 163, 164 and 166 with conductors 162 and 163 connected across battery 159 and conductors 164 and 166 connected across battery 161. The batteries are so connected that battery 159 is connected to the odd stages in the A line and the even stages in the B line. Battery 161 is connected to the other complementary stages, i.e., even A and odd B stages.

The output of the last stage of the top and bottom rows or lines is supplied between the output terminal 171 and the ground terminal 172. It is readily apparent that the full wave delay line can be comprised of any number of stages, and for that reason, the last two stages have been designated as odd and even stages. As shown, the last stages has been designated as an even stage. The diode 151 in each of the A and B stages for the last stages is connected to a diode 173. The diodes 173 are both connected to the output terminal 171. The conductors connecting the diodes 151 and 173 for the last stage A are connected to conductor 166 by a resistance 174, and the conductor connecting the diodes 151 and 173 for the last stage B are connected to conductor 163 by a resistance 176. The common conductor 133 is connected to the output 171 through a resistance 177.

The squarewave oscillator consists of a pair of transistors 181 and 182 having base, collector and emitter elements 1, 2 and 2. The base 1 of transistor 181 is connected to one side of the feedback winding 126, and the other side of the winding is connected to one side of a resistor 183. The other side of the resistor 183 is connected to one side of a switch 184, and the other side of the switch 184 is connected to the negative terminal of a D.-C. power supply 186. The positive terminal of the power supply battery 186 is connected to the positive terminal of a battery 187 and to one terminal of potentiometer 190 by a conductor 188. The negative terminal of battery 187 is connected to the other terminal of potentiometer 190. The sliding connection of potentiometer 190 is connected through switch 192 to the center tap 119. The emitters 3 of both of the transistors 181 and 182 are connected to the conductor 188. The base of the transistor 182 is connected to one side of the winding 127, and the other side of the feedback winding 127 is connected to the resistor 183. A capacitor 199 is provided for each of the transistors and connects the base of the transistor to the conductor 188.

The negative terminal of the battery 159 is connected to one side of the winding 121, whereas the other side of the winding 121 is connected to the negative terminal of the battery 161.

Operation of the circuit shown in FIGURE 7 may now be briefly described as follows. Let it be assumed that the core 117 has a square hysteresis loop and is initially negatively saturated. Let it also be assumed that transistor 181 is initially "on;" meaning that the collector 2 is conducting and that the voltage from the battery 187 is impressed on the primary winding 118. Let it also be assumed that switches 184 and 192 are closed.

This constant voltage applied across the winding 118 causes the flux in the core 117 to change at a constant rate from negative saturation toward positive saturation. Transformer action occurs during this unsaturated time and a constant voltage appears across the winding 121 which has a relationship in accordance with the turns on the secondary winding with respect to the turns on the primary winding 118. The dot terminals are positive during this half cycle. The winding 126 provides a positive component to the emitter of the transistor 181 contributing to keeping it on and the winding 127 provides a negative component to the emitter of the transistor 182 contributing to keeping it off. The collector of the transistor 182 has twice the negative voltage of the battery 187. The emitter current of the transistor 181, flowing through resistor 183, produces a drop in excess of the voltage of battery 186 so that the emitter of transistor 182 is held minus.

When the flux in the core 117 reaches positive saturation, the voltage across all windings goes to zero. Lack of positive voltage in the feedback winding 126 causes transistor 181 to turn off. The current in the resistor 183, therefore, goes to zero and the voltage of battery 186 is impressed on the emitter of transistor 182. The emitter of transistor 182 starts to conduct and the subsequent collector current places a negative voltage on the winding 118 between the center tap 119 and the collector 2 of the transistor 182. The flux, therefore, starts to decrease from positive saturation and the transformer voltage in the winding 127 tends to keep transistor 182 on, and the voltage in the winding 126 tends to keep transistor 181 off. The voltage in the secondary winding 121 reverses suddenly.

This squarewave generator circuit has the unique advantage that the frequency is proportional to the voltage, and that the volt-time integral of each one-half cycle is constant, independent of the frequency. The frequency can be varied by changing the value of the voltage supplied by the battery 187 by use of the potentiometer 190. As the frequency is varied, the delay time from the full wave delay line is also varied as hereinafter described.

In describing the operation of the remainder of the circuitry in FIGURE 7, it will be noted that the output voltage from the center tap winding 121 has been designated as $e_s$, the peak value of the squarewave, whereas the output voltages from the windings 123 and 124 have been designated as $2e_s$, meaning that the second winding produces a voltage which is twice that between the conductors 163 and 166 and the center tap 122 of the first secondary winding 121.

Let it be assumed for the description of the remainder of the operation of the ciruit of FIGURE 7 that the bias supply 136 has a voltage which is approximately equal to one-half $e_s$. Also, let it be assumed that the flux in the cores 101 in all the stages is at negative saturation value initially. The voltage across the input terminal 106 and the buss 137 is positive because of the bias battery 136. When $e_s$ is negative, buss 129 is negative with respect to buss 131 and buss 142 is positive with respect to buss 143. Diode 132 is conducting and diode 144 is non-conducting. Therefore, no voltage from the input appears across the primary winding 103 of stage 1B. The input voltages are passed by diodes 108 and 132 and appear across the primary winding 103 of stage 1A. The flux in the core 101 for stage 1A rises from negative saturation an amount equal to the volt-time integral of the input plus bias. At the end of the half cycle, $e_s$ becomes positive, diode 144 conducts, and diode 132 is biased to non-conduction. The input plus bias voltage is now applied across the primary winding 103 of the stage 1B, and flux in the core 102 of stage 1B rises. Simultaneously, the positive $e_s$ voltage is applied to conductor 153 through the diode 157 which is conducting to the buss 163. Both diodes 151 and 152 conduct, applying a positive voltage to the mounted end of the secondary winding 104 of stage 1A, and the dot end of the primary winding 103 of the stage 2A. By transformer action, a negative voltage appears at the dot in the primary winding 103 of stage 1A. This voltage is added in series with the value of the voltage $2e_s$ which is impressed across the diode 132 by winding 123 through the conductors 129 and 131. The voltage from the dot side of the primary winding 103 of stage 1A is, therefore, $+e_s$. The voltage from the input terminal 106 to the buss 137 is less than $+e_s$ so diode 108 is non-conducting during the part of the half cycle when $e_s$ is positive.

As the flux in the core in stage 1A is reset to negative saturation, the flux in the core of stage 2A rises an exactly equal amount up from negative saturation. When the flux in the core in stage 1A is negatively saturated, the secondary winding 104 of the core in stage 1A can no longer sustain voltage and the voltage drop from the conductor 153 to the buss goes to zero. This removes the voltage from the primary winding of the magnetic core for stage 2A and the flux in the magnetic core of stage 2A stops changing.

The resistor 158, the diode 157, and the battery 159 provide a variable series impedance between the $e_s$ power supply and the secondary winding of the magnetic core. When the diodes 151 and 152 have high impedance, the resistor 158 and the diode 157 each carry equal amounts of D.-C. current. When diodes 151 and 152 have low impedance, and the secondary winding of the preceding stage and the primary winding of the succeeding stage have high impedance, these windings can draw the magnetizing current necessary for the voltage $e_s$ by reducing the current through the diode 157 without changing the voltages. Diode 157 has very low impedance as long as it is conducting. The resistor 158 is chosen so that the magnetizing current for the two cores causes the current in the diode 157 to be almost zero. When the core for stage 1A saturates, the voltage across the secondary winding of the core goes to zero which would establish a short circuit on the $e_s$ supply except that the extra current causes diode 157 to go through zero current and become an open circuit. Now, the high resistance 158 is the only current-carrying element, and it has a maximum current when $e_s$ has a maximum value. This maximum current is only slightly more than the magnetizing current and does not produce any significant voltage drops which could contribute to errors by being integrated and changing the flux in the core of stage 2A. Therefore, the flux in the core of stage 2A remains constant during the remainder of the positive $e_s$ half cycle.

When $e_s$ is negative, stage 1A measures the input; stage 2A gates into stage 3A; and stage 1B is gated into stage 2B. The same functions are performed by stages 1B, 2B, etc., during the negative half cycles as are performed by stages 1A, 2A, 3A, etc., during the positive half cycles.

It will be noted that the successive stages of the upper or B connected stages in FIGURE 7 are connected to alternate polarities of $e_s$ by the busses 162, 163, 164 and 166. The successive stages of the lower or A line, likewise, are connected to alternate polarities. It will also be noted that the lower stage bearing the same number as the upper stage is connected to a polarity opposite from that of the upper stage. These connections result in the following operation: When $e_s$ is positive, even B and odd A stages are being reset, and even A and odd B stages are receiving an input. At the end of this half cycle, the odd A and even B stages are empty (negative saturation), and the even A and odd B stages are memory storage elements.

The last stages in the circuit diagram in FIGURE 7 have been shown as even stages. However, if desired, the last stage can be an odd stage. When $e_s$ is negative, the voltage on the secondary winding 104 in stage *n*A is positive and diodes 151 and 173 are conducting. The voltage across the secondary winding 104 also appears across the resistor 177. The resistors 174 and 176 are low in resistance so that the current and power of resistor 177 can be large. When the magnetic core for stage even-A has been reset, the voltage across the secondary winding of stage even-A goes to zero, and the short circuit current is limited only by the resistor 174. The potential from the output terminal 171 to the common conductor 133 is pulse width modulated. The average value of the pulse is proportional to the input and bias, but delayed by a number of half cycles of $e_s$ with the number of half cycles depending upon the number of stages in the delay line.

In a similar manner, the secondary winding 104 of the stage even-B is reset when $e_s$ is positive and buss 163 is positive. Diodes 151 and 173 apply the read-out pulse to the load resistor 177. The resistor 176 limits the short circuit current. Resistor 177 has an average voltage drop equal to the input and bias. Since terminal 172 is positive with respect to the buss 133 by the bias potential, the drop from the output terminal 171 to the ground terminal 172 is proportional to the input, but delayed by as many half cycles of $e_s$ as the number of cores in the delay lines.

Although no filtering has been shown in conjunction with the circuitry of FIGURE 7, it is readily apparent that a zero order hold of the type shown in FIGURE 6 can be incorporated in the circuitry of FIGURE 7 to provide a filtered output, if desired.

By way of example, one embodiment of the invention as shown in FIGURE 7 had the following components with the following values.

Magnetic cores 101: Magnetics, Inc., type #50057—1 mil Orthonol with 114 turns in the primary winding and 114 turns in the secondary winding.

Magnetic core 116: Magnetics, Inc., type #50003
- Winding 118—60 turns center tapped
- Secondary winding 121—62 turns center tapped
- Windings 123 and 124—62 turns each All diodes: 1N307

Transistors 181 and 182: 2N174

Batteries:

| | |
|---|---|
| **186** | 22.5 volts. |
| **187** | 10 volts. |
| **159** | 400 volts. |
| **161** | 400 volts. |

Resistors:

| | |
|---|---|
| 109 and 141 | 1KΩ. |
| 158 | 10KΩ. |
| 174 and 176 | 4000Ω. |
| 177 | 200Ω. |
| 183 | 620Ω. |
| 190 | 0–20Ω variable. |

Capacitors 199: .005 mf.

With such components, it was found that the full wave delay line operated very satisfactorily. The voltage $e_s$ in one-half of the winding 121 was approximately 10 volts squarewave at 10 kc. per second. The voltage $2e_s$ across each of the windings 123 and 124 was approximately 20 volts. When the diodes 151 and 152 had a high impedance, the resistor 158 and the diode 157 were found each to carry 40 milliamperes D.-C. When the high resistance 158 was the only current carrying element, its maximum current was found to be 41 milliamperes with $e_s$ being equal to 10 volts. By varying the potentiometer 190, it was found possible to vary the voltage and, therefore, produce a voltage controlled dead time or delay time. As can be readily apparent to those skilled in the art, a dead time of this type is very advantageous in periodically sampled systems.

In order to increase the utility of the delay line, operation at higher audio frequencies and radio frequencies may be attained with the use of ferrite cores in place of the tape wound cores as is well known to those skilled in the art.

In FIGURE 8, we have shown a block diagram for generating a polynomial in $z$ where $$z^{-1}=\exp(-sT)$$

where T is dead time or sampling time. The block diagram as shown in FIGURE 8 is comprised of a plurality of delay units 201, 202 and 203 which are serially connected to an input 204. The output of the last unit 203 is connected to a block 206 representing a constant $K_3$. The output of unit 202 is connected to a block 207 representing a constant $K_2$. The output of the unit 201 is connected to a block 209 representing a constant $K_1$ and the input is connected to a block 212 representing a constant $K_0$. The blocks 206, 207, 209 and 212 provide various amounts of attenuation or gain in accordance with the weighting desired for the respective signal channels. The outputs of the blocks 206, 207, 209 and 212 are connected to an adder 213 with controllable polarity to produce a composite output 214 equal to weighted sum of the various intermedaite outputs taken with either positive or negative sine.

Each of the delay units shown in FIGURE 8 can be made with one or more of the magnetic cores shown in FIGURE 7. For example, if three cores are desired for each delay, then samples would be taken at the outputs of cores 3A, 6A and 9A for half wave operation and also from cores 3B, 6B and 9B for full wave operation.

In FIGURE 9, we have shown the wiring diagram for one of the delay units or sampling circuits as shown in block form in FIGURE 8. A portion of the circuit shown in FIGURE 7 is shown in FIGURE 9 and is labelled as stage $n$A and $n$B and $(n+1)$A and $(n+1)$B. As pointed out previously, the dot end of the odd core windings and the undotted end of the even core windings are connected to the buss 133. The diode 151 connects the conductor 153 to the secondary winding of the core for stage $n$A, diode 152 connects the conductor 153 to the primary winding of the core for stage $(n+1)$A, and similarly, for the lower half of the delay line. The conductor 153 of each of the delay lines is connected to one side of a switch 221 and the other side of the switch is connected to a diode 222. The other side of the diode 222 is connected to a resistor 223, and the other side of the resistor is connected to an adjustable potentiometer 224 which is connected to the output terminal 226. The output of the circuit is, therefore, supplied from the terminal 226 to the chassis ground 227. The summing resistor 223, the diode 222, and the switch 221 connect the output terminal 226 to the conductor 153 for the top and bottom, or A and B delay lines. The voltage from the terminal 226 to the chassis ground 227 is the sampled voltage equivalent to that on the output circuit 208 as shown in FIGURE 8. The coefficient $k_n$ is adjusted by varying the value of the potentiometer 224. The voltage from the terminal 226 to chassis ground is a signal which is found on the output circuit 208 of FIGURE 8.

The circuit in FIGURE 9 is for a positive polarity for the coefficient $k_n$. A negative polarity can be obtained by using the difference between the sum of the signals to be considered positive and the sum of the signals to be considered negative. Such an example is shown in the filter in FIGURE 5.

Symmetrical networks each consisting of a switch 228, a diode 229, and a resistor 230, are connected to the dotted terminals of the primary windings of stage $(n+1)$A and stage $(n+1)$B. These networks, which are connected to the first time derivative of the supply voltage, $e_0'$, perform the function of eliminating any accumulation of unwanted partial reset of stages $(n+1)$A and $(n+1)$B due to imperfections in the constituant diodes and magnetic cores. $e_0'$ is a Direa delta function for a square wave supply voltage wave and can be obtained by a resistor-capacitor differentiating network from the square wave supply voltage as is well known to one skilled in the art.

It will be noted that in the full wave delay line shown in FIGURE 7 that the diode polarities and the winding polarities in every stage are identical In the half wave delay line which is shown in FIGURE 2, the diode and winding polarities in the odd stages have the opposite signs from the polarities in the even stages. The polarities in any one or any combination of stages in the circuitry in FIGURE 7 may be reversed if desired as shown in FIGURE 2. This will permit weighting circuits as in FIGURE 9 of either polarity from any stage.

The system shown in FIGURE 8 produces a $z$ transform compensator whose uses are well known to those skilled in the art. These are discussed by Eli Jury in "Sampled Data Control Systems," 1958, published by John Wiley and Sons, chapter 5, pp. 182–214; and by Franklin and Ragazzini in "Sampled Data Control Systems," 1958 published by McGraw-Hill Book Company, chapter 7, pp. 145–198. This compensator can also be used as a component in the systems described in the copending applications "Control System and Method" by Otto J. M. Smith, Serial No. 702,064, filed December 11, 1957 and now abandoned in favor of application Serial No. 2,091 filed January 6, 1960, now Patent No. 3,141,982; "Control System and Method" by Otto J. M. Smith, Serial No. 646,412, filed March 15, 1957, now Patent No. 3,057,883; and "Method and Apparatus for Generating a Signal and a System and Method for Utilizing the Same" by Otto J. M. Smith, Serial No. 782,069, filed December 22, 1958, now Patent No. 3,060,378.

The compensator in FIGURE 8 produces the output-divided-by-input transference of $$k_0+k_1\exp(-sT)+k_2\exp(-2sT)+k_3\exp(-3sT)$$

which is equal to $$k_0+k_1z^{-1}+k_2z^{-2}+k_3z^{-3}$$

As discussed in the textbooks mentioned above, there is also a need for a compensator whose transference is a ratio of polynomials in $z$. This can be obtained from the system in FIGURE 8 by the addition of a negative feedback branch from the output of block 201 back to the input of block 201, with gain coefficient of $k_f$. If $k_2$ and $k_3$ are set equal to zero for this case, then the transference will be $$k_0+\frac{k_1z^{-1}}{1+k_fz^{-1}}=\frac{k_0+(k_0k_f+k_1)z^{-1}}{1+k_fz^{-1}}$$

This illustrates how a ratio of polynomials in $z$ can be obtained. The circuit for the feedback branch around block 201 is shown in FIGURE 10.

In FIGURE 10 we have shown a circuit to be used in conjunction with FIGURE 7. By breaking the connections between the common conductor 133 and the conductors 134 and 145 in FIGURE 7, a double-pole double throw switch 231 can be inserted between the conductors 134 and 145 and the common buss 133. The switch is provided with contacts 1 and 2. The contacts 2 are connected to the common buss 133, whereas the contacts 1 are connected to the negative terminals of bias removing batteries 232. The positive terminals of the bias removing batteries 232 are connected to the conductors 153 as shown. The conductors 153 in FIGURE 10 can be any stage in FIGURE 7.

The operation is as follows: When the reset voltage from $e_0$ is passed through the diode 157 and one of the cores is being reset while the same voltage is setting the following core, this same voltage also appears between conductors 134 and 145 in FIGURE 10, less the voltage of battery 232. This voltage, therefore, is impressed in series with the input circuit of FIGURE 7, and is the feedback signal desired. The purpose of switch 231 is to choose the appropriate polarity of feedback.

We claim:

1. In a delay line for delaying a signal, a plurality of serially connected memory stages, the signal being supplied to one of said stages, each of said stages having a storage element storing information as an analog quantity, means for applying a shifting signal of a predetermined frequency to said one stage to cause the information stored in said one stage to generate a width-modulated pulse whose width is proportional to the information stored in said one stage, and means for applying said width-modulated pulse to the succeeding stage to be transferred to the succeeding stage.

2. A delay line as in claim 1 wherein said shifting signal is applied repetitively at a predetermined frequency and wherein the amount of delay is dependent upon the frequency of the shifting signal.

3. A delay line as in claim 1 wherein said means for applying a shifting signal consists of variable frequency means.

4. A delay line as in claim 2 wherein said frequency is proportional to the voltage of the shifting signal.

5. A delay line as in claim 2 wherein said frequency is controllable and the volt-time integral of each half cycle of the shifting signal is constant irrespective of frequency.

6. In a delay line for delaying a signal, a plurality of serially connected memory stages, the signal being supplied to the first of said stages, each of said stages having a storage element storing information as an analog quantity, and means for applying a shifting signal to a plurality of said stages to generate a plurality of width-modulated pulses each having a width proportional to the information stored in each of said stages, and means for applying each of said width-modulated pulses to the succeeding stage to cause the information stored in said stages to be transferred to the succeeding stages.

7. In a delay line for delaying an information signal, a plurality of serially connected memory stages, the signal being supplied to the first of said stages, each of said stages having a storage element storing information as an analog quantity which is linearly proportional to the information signal, and means for applying a plurality of shifting signals to a plurality of said stages to cause each information stored therein to be transferred as an area-modulated output pulse to the succeeding stage, the output pulse having a volt-time integral which is an analog measure of the stored information.

8. A delay line as in claim 7 wherein the shifting signals are applied simultaneously.

9. A delay line as in claim 8 wherein the shifting signals are applied sequentially.

10. In a delay line for delaying a signal, a plurality of serially connected memory stages, the signal being applied to the first of said stages, each of said stages having a storage element storing information as a physical quantity having a magnitude which is continuously adjustable in an analog fashion, means for generating a plurality of shifting signals, and means for applying said shifting signals to said stages, the application of a shifting signal to a stage causing the information therein to be transferred as an output pulse to a succeeding stage, the output pulse having an area which is an analog measure of the stored information.

11. A delay line as in claim 10 wherein all of said shifting signals have the same frequency.

12. A delay line as in claim 11 wherein the amount of delay is dependent upon the frequency of the shifting signals.

13. In a delay line for delaying a signal, a plurality of serially connected memory stages, the signal being supplied to the first of said stages, each of said stages having a storage element storing information as a physical quantity whose magnitude of one polarity is adjustable continuously in an analog fashion to a value less than a predetermined maximum remanent limit which cannot be exceeded and whose magnitude of opposite polarity is also adjustable continuously in an analog fashion, means for generating a shifting signal of controlled frequency, and means for applying said shifting signal to one of said stages to cause the information stored therein to be transferred to the succeeding stage.

14. In a delay line for delaying a signal, a plurality of serially connected memory stages, the input signal being supplied to the first of said stages, each of said stages having a storage element storing information in an analog quantity, means for detecting the quantity of said stored information in each of said storage elements, means for generating a plurality of pulse-width modulated pulses, each with a modulation proportional to a corresponding quantity of said stored information, means for applying said pulse-width modulated pulses to succeeding stages, means for deriving a plurality of signals from the outputs of the stages, and means for combining said last named signals to produce a composite output.

15. A delay line as in claim 14 wherein said means for deriving a plurality of signals includes means for weighting the signals in various proportions.

16. A delay line as in claim 14 wherein said means for combining said last named signals includes means for weighting each of said signals with controllable polarities.

17. In a delay line for delaying a signal which is the difference between a system input and a system output, a plurality of serially connected stages, the signal being supplied to the first of said stages, each of said stages having a storage element storing information as a physical quantity having a magnitude which is continuously adjustable in an analog fashion, means for detecting the quantity of said stored information in each of said storage elements, means for generating a plurality of pulse-width modulated pulses, each with a modulation proportional to a corresponding quantity of said stored information, means for applying said pulse-width modulated pulses to succeeding stages, means for deriving a plurality of signals from the outputs of the stages, means for combining said last named signals to produce a composite signal output, and means for applying a shifting signal to a plurality of said stages to cause the information stored in said stages to be transferred as output pulses to the succeeding stages the output pulses having a volt-time integral which is an analog measure of the stored information.

18. In an artificial delay line for a continuous input signal, a plurality of sequentially connected magnetic cores, an output circuit, means for storing the said continuous input signal as a change in the magnetic condition of the first of said magnetic cores proportional to the magnitude of the said continuous input signal, means for detecting the magnetic condition of each magnetic core and generating a width-modulated pulse with a modulation proportional to the difference between the magnetic condition of each of said magnetic cores and a predetermined limiting remanent fluix value, means for producing a change in the magnetic condition of each of the next succeeding magnetic cores proportional to the width of each respective width-modulated pulse, and means for coupling into the said output circuit a weighted sum of said width-modulated pulses.

19. In an artificial delay line for an input analog signal, a plurality of sequentially connected magnetic cores, a source providing a predetermined time interval, an output circuit, means for storing the time integral of the said analog input signal during the said predetermined time interval as a change in the magnetic condition of the first of said magnetic cores from a predetermined limiting remanent flux value proportional to the magnitude of the said integral, means for detecting the magnetic condition of each magnetic core and generating a width-modulated pulse with a modulation proportional to the difference between the magnetic condition of each of said magnetic cores and a predetermined limiting remanent flux value, means for producing a change in the magnetic condition of each of the next succeeding magnetic cores proportional to the width of each respective width-modulated pulse, and means for coupling into the said output circuit a weighted sum of said width-modulated pulses.

20. In an artificial delay line for an input signal, a plurality of sequentially connected magnetic cores, a source providing a predetermined time interval, an output circuit, means for storing the time integral of the said input signal during the said time interval as a change in the magnetic condition of the first of said magnetic cores, said change being the difference between the final magnetic condition and a limiting remanent flux value, said change being proportional to said time integral, means for detecting the magnetic condition of each of said magnetic cores and generating a plurality of area-modulated pulses, each with an area modulation proportional to the difference between the magnetic condition of each respective magnetic core and a limiting remanent flux value, means for producing a change in the magnetic condition of each of the next succeeding magnetic cores proportional to the area of each respective area-modulated pulse, and means for coupling into the said output circuit the area-modulated pulse derived from the last magnetic core.

21. In an artificial delay line for a continuous input signal, a plurality of sequentially connected magnetic stages, each of said magnetic stages containing a magnetic core of substantially rectangular-hysteresis-loop material, a source providing repetitive time intervals, said time intervals being alternately designated as gate-on-time and gate-off-time, an output circuit, means for storing the time integral of said continuous input signal during one of said gate-on-times as a change in the magnetic condition of the first of said magnetic cores, said change being the difference between the final magnetic condition at the end of said one of said gate-on-times and a maximum remanent flux value for the said rectangular-hysteresis-loop material, said change being proportional to said time integral, means for detecting the magnetic condition of each of said magnetic cores and generating a plurality of area-modulated pulses, each pulse having an area modulation proportional to the difference between the magnetic condition of each said respective magnetic core and a maximum remanent flux value for each core, means for producing a change in the magnetic condition of each of the next succeeding magnetic cores proportional to the area of each respective area-modulated pulse, and means for coupling into said output circuit a weighted sum of said area-modulated pulses.

22. In a system for producing a time delay for a continuous input signal, a first delay line consisting of a plurality of sequentially connected magnetic cores, alternate cores in the sequence being designated odd and even, a second delay line consisting of a plurality of sequentially connected magnetic cores, alternate cores in the sequence being designated odd and even, a source of gating signals producing a sequence of gate intervals, an output circuit, means for initially setting the magnetic condition of each magnetic core at a predetermined remanent flux value, means for alternately gating said input signal into a first gated signal and a second gated signal, means for producing a change from the predetermined remanent flux value to a new magnetic condition in the first magnetic core of the said first delay line, said change having a magnitude at the end of a first gate interval proportional to the time integral during said first gate interval of the said first gated signal, means for detecting the magnetic condition of each odd magnetic core in said first delay line during the second gate interval or next succeeding gate interval following the said first gate interval, means for generating a plurality of area-modulated pulses each with an area proportional to the difference between the said magnetic condition of each odd magnetic core in said first delay line and the respective predetermined remanent flux value for that core, means for producing a change in the magnetic condition of each of the next succeeding even magnetic cores proportional to the respective areas of said area-modulated pulses derived from each respective preceding odd magnetic core, means for detecting the magnetic condition of each even magnetic core in said first delay line during the third gate interval or next plus one succeeding gate interval following the said first gate interval, means for generating a plurality of area-modulated pulses each with an area proportional to the difference between the said magnetic condition of each even magnetic core in said first delay line and the respective predetermined remanent flux value for that even core, means for producing a change in the magnetic condition of each of the next succeeding odd magnetic cores in said first delay line proportional to the respective areas of said area-modulated pulses derived from each respective preceding even magnetic core, means for producing a change from the predetermined remanent flux value to a new magnetic condition in the first magnetic core of the said second delay line, said change having a magnitude at the end of said second gate interval proportional to the time integral during said second gate interval of the said second gated signal, means for detecting the magnetic condition of each odd magnetic core in said second delay line during the said third gate interval, means for generating a plurality of area-modulated pulses each with an area proportional to the difference between said magnetic condition of each odd magnetic core in said second delay line and the respective predetermined remanent flux value for that odd core, means for producing a change in the magnetic condition of each of the next succeeding even magnetic cores proportional to the respective areas of said area-modulated pulses derived from each respective preceding odd magnetic core, means for detecting the magnetic condition of each even magnetic core in said second delay line during the said second gate interval, means for generating a plurality of area-modulated pulses each with an area proportional to the difference between the said magnetic condition of each even magnetic core in said second delay line and the respective predetermined remanent flux value for that even core, means for producing a change in the magnetic condition of each of the next succeeding odd magnetic cores in said second delay line proportional to the respective areas of said area-modulated pulses derived from each respective preceding even magnetic core, and means for coupling into the said output circuit a weighted sum of the area-modulated pulses derived from the odd cores in the first delay line, the area-modulated pulses derived from the even cores in the first delay line, the area-modulated pulses derived from the odd cores in the second delay line, and the area-modulated pulses derived from the even cores in the second delay line.

23. In a $z$-transform compensator for a sampled-data system, means supplying an input signal, a plurality of sequentially connected magnetic cores, a source of predetermined time intervals, an output circuit, means for storing the time integral of the said input signal during a first time interval as a change in the magnetic condition of the first of said magnetic cores, said change being the difference between the final magnetic condition at the end of said first time interval and a limiting remanent flux value, said change being proportional to said time integral, means for detecting the magnetic condition of each of said magnetic cores and generating a plurality of area-modulated pulses, each with an area modulation proportional to the difference between the magnetic condition of each respective said magnetic core and a limiting remanent flux value, means for producing a change in the magnetic condition of each of the next succeeding magnetic cores proportional to the area of each respective area-modulated pulse derived from the preceding magnetic core, and means for coupling into said output circuit a weighted sum of said area-modulated pulses.

24. A compensator as in claim 23 wherein said means supplying an input signal consists of means for supplying a compensator input signal, means for producing a feedback signal from a different weighted sum of said area-modulated pulses, and means for adding said feedback signal to the said compensator input signal to produce said input signal.

25. A delay line as in claim 20 wherein said means for detecting the magnetic condition of each of said magnetic cores and generating a plurality of area modulated pulses includes a first diode, a resistor, and a constant voltage source, said first diode being polarized to carry forward current in the same direction as that provided by the said constant voltage source, said resistor having a resistance magnitude sufficient to limit the current in said winding to slightly more than magnetizing current, and a second diode connected in parallel with the series combination of said constant voltage source and said resistor, said second diode being polarized to carry forward current in the same direction as that provided by the said constant voltage source.

26. A delay line as in claim 20 wherein said source providing a predetermined time interval comprises a square-wave generator and wherein the detecting means impresses a voltage from said square-wave generator across one of said cores, said voltage providing a volt-time integral per half-cycle sufficient to change said magnetic condition to said limiting remanent flux value.

27. A delay line as in claim 20 wherein said source providing a predetermined time interval comprises means for generating repetitive pulses and wherein the detecting means impresses a voltage from said pulse generator across one of said cores, said voltage providing a volt-time integral per pulse sufficient to change said magnetic condition to said limiting remanent flux value.

28. A delay line as in claim 20 wherein said source providing a predetermined time interval comprises means delivering a sequence of pulses to said cores so that the first pulse in the said sequence energizes the last magnetic core, the second pulse in the said sequence energizes the next to the last magnetic core, and the last pulse in the said sequence energizes the first magnetic core.

29. A delay line as in claim 20 wherein said source providing a predetermined time interval delivers a wave whose volt-time integral per half-cycle is constant for different time interval adjustments.

References Cited by the Examiner

UNITED STATES PATENTS

| | | | |
|---|---|---|---|
| 2,825,890 | 3/1958 | Ridler | 340—174 |
| 2,831,150 | 4/1958 | Wright | 340—174 |
| 2,873,438 | 2/1959 | Bieganski | 340—174 |
| 2,936,446 | 5/1960 | Rosenberg | 340—174 |
| 2,994,068 | 7/1961 | Richardson | 340—174 |
| 3,087,143 | 4/1963 | Bagly | 340—173 |
| 3,117,234 | 1/1964 | Hubbard | 307—88 |

IRVING L. SRAGOW, *Primary Examiner.*